US009219985B2

United States Patent
Morgan

(10) Patent No.: US 9,219,985 B2
(45) Date of Patent: Dec. 22, 2015

(54) METHOD AND SYSTEM FOR COOPERATIVE STOCHASTIC POSITIONING IN A MOBILE ENVIRONMENT

(75) Inventor: Yasser Morgan, Regina (CA)

(73) Assignee: University of Regina, Regina, Saskatchewan (CA)

( * ) Notice: Subject to any disclaimer, the term of this patent is extended or adjusted under 35 U.S.C. 154(b) by 293 days.

(21) Appl. No.: 13/812,739

(22) PCT Filed: Jul. 27, 2010

(86) PCT No.: PCT/CA2010/001165
§ 371 (c)(1),
(2), (4) Date: Mar. 27, 2013

(87) PCT Pub. No.: WO2012/012860
PCT Pub. Date: Feb. 2, 2012

(65) Prior Publication Data
US 2013/0178231 A1 Jul. 11, 2013

(51) Int. Cl.
*H04W 4/02* (2009.01)
*G01S 5/02* (2010.01)
*G01S 19/51* (2010.01)

(52) U.S. Cl.
CPC ............. *H04W 4/023* (2013.01); *G01S 5/0278* (2013.01); *G01S 5/0284* (2013.01); *G01S 5/0289* (2013.01); *G01S 19/51* (2013.01)

(58) Field of Classification Search
CPC ..... G01S 19/51; G01S 5/0278; G01S 5/0284; G01S 5/0289; H04W 4/023
See application file for complete search history.

(56) References Cited

U.S. PATENT DOCUMENTS

| 6,745,124 | B2 | 6/2004 | Aloi et al. | |
|---|---|---|---|---|
| 7,274,332 | B1 * | 9/2007 | Dupray | 342/450 |
| 2006/0095348 | A1 * | 5/2006 | Jones et al. | 705/29 |
| 2007/0005292 | A1 | 1/2007 | Jin | |
| 2010/0017115 | A1 | 1/2010 | Gautama | |

FOREIGN PATENT DOCUMENTS

CN 101587182 11/2009

OTHER PUBLICATIONS

European Patent Application No. 10855132.6 Supplemental Search Report dated Feb. 11, 2014.

* cited by examiner

*Primary Examiner* — Kashif Siddiqui
(74) *Attorney, Agent, or Firm* — Brett A. North; Garvey, Smith, Nehrbass & North, L.L.C.

(57) ABSTRACT

Cooperative stochastic positioning in a mobile environment is provided. Position announcements transmitted wirelessly from objects in the immediate area are received at an object of interest or primary object. The position announcements provide the current position data of the respective object in relation to a common coordinate system. The received position announcements are discretizing to obtain a plurality of data groupings based upon a clustering criteria applied to the received position data. Clustering of the data groupings is performed to determine which clusters dataset from the data groupings provide sufficient and consistent position accuracy to determine a relative position of the primary object. A stochastic automata model is then applied to selected cluster dataset to evaluate relative cluster weights in order to determine the relative position of the object of interest. The accuracy of a current position of the object of interest can then be updated based upon determined relative position.

24 Claims, 7 Drawing Sheets

METHOD AND SYSTEM FOR COOPERATIVE STOCHASTIC POSITIONING IN A MOBILE ENVIRONMENT

TECHNICAL FIELD

The present disclosure relates to positioning systems and in particular to improving accuracy of absolute and relative positioning between objects in a mobile environment.

BACKGROUND

Regrettably, more than 29,000 fatalities, 2.2M injuries, and $100 Billion dollars in financial losses occur annually on United States roads alone. There has been shared consensus among researchers and governments that those figures can be brought down by applying modern safety applications. The evolving technologies promise to make transportation safer than ever by embedding electronic safety features powered by wireless sensing in vehicles and roads. Location based features are at the heart of this evolution. In particular, identifying the exact position of a moving vehicle (object) is a key aspect to developing most of the vehicular safety features and commercial Location-Based-Applications (LBA).

Global Navigation Satellite Systems (GNSS) such as Geographical Positioning Systems (GPS) have been used for positioning objects with reasonable accuracy. GPS provides typically less than 70 cm accuracy and there have been several studies showing that GPS cannot be efficiently used in urban environment due to dilution of precision and the urban canyon phenomenon. Most safety applications require sub centimeter accuracy with high reliability in urban and sub-urban environments.

Undoubtedly, GPS is the most popular GNSS technology used for positioning objects up-to a normal accuracy of a few meters by timing the transmitted signal along a line-of-sight (LoS) between the satellite and the mobile earth object. If no clear LoS is available between the satellite and the mobile object, ranging to that satellite becomes impossible. The popularity of GPS led to increased interest in Location Based Systems (LBS) where applications behave differently based on user position. Serious and high-end LBS systems such as safety and mission-critical applications cannot tolerate limited positioning accuracy, limited signal availability in urban environment, cloudy/bad weather, or the lack of integrity indicators.

Accurate GNSS positioning (error <30 cm) requires the availability of multiple satellite signals (5+) which is impossible in urban and metropolitan areas. The transportation industry has an inevitable and imperative need to resolve the problem of inaccurate positioning in order to unlock the essential development of safety and automation applications. Unfortunately, GNSS and GPS systems exhibit the following inherent distinctive limitations:

a) Limited signal availability in urban environments, cloudy skies, or tunnels.

b) Insufficient accuracy to serve serious and high-end LBS systems like safety and mission-critical application.

c) Loss of precision until Time-To-First-Fix (TTFF) is made available. The TTFF is the time required for the receiver to acquire ephemeris as well as an almanac for all satellites that contains coarse orbit and status information for each satellite in the constellation. Fix times are unacceptably long, and fixes may never be reached when attenuation levels exceed 30 dB, which is likely in an urban environment and in bad weather.

d) Limited redundancy since GPS has no alternative system to be used in its absence.

e) Satellite-based systems are too centralized and lack the desired localized control.

Accordingly, there is a need for an accurate positioning system and method that provides improved positioning accuracy in a mobile environment.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
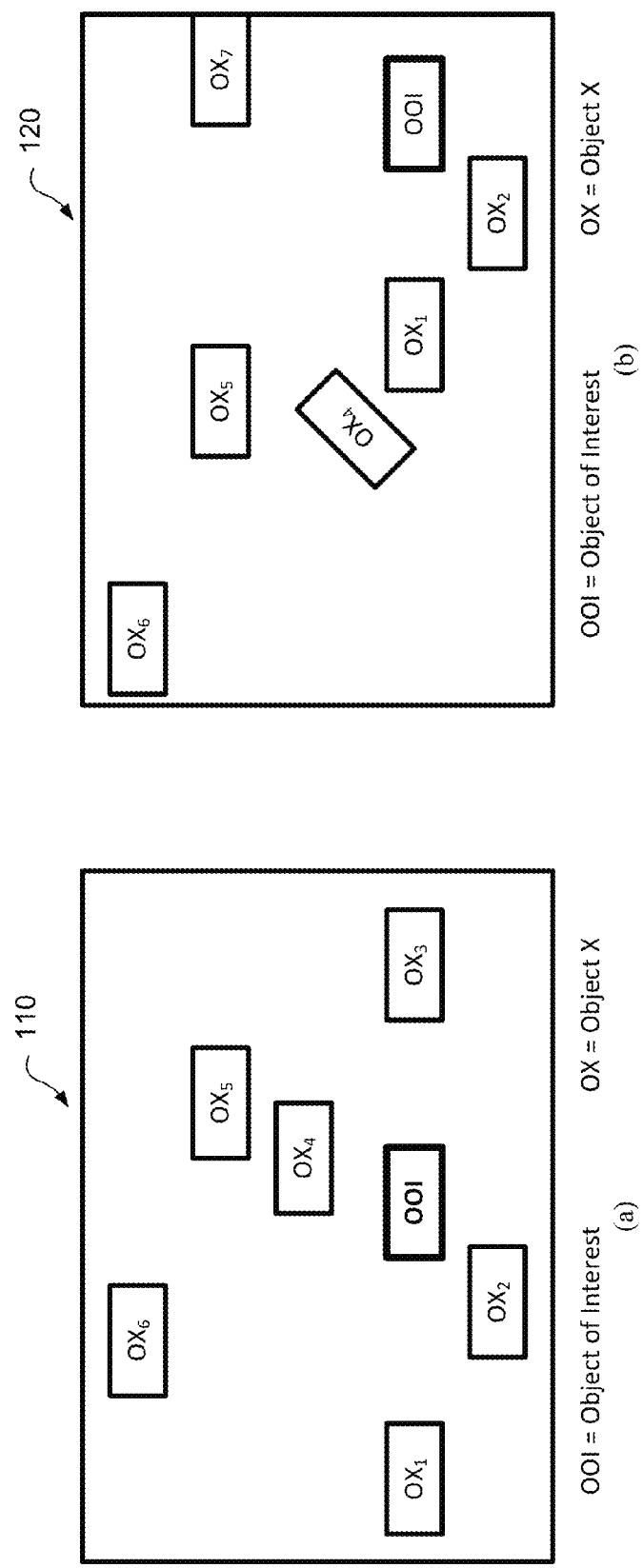
FIG. 1 shows a representation of mobile environment with random motion where (a) shows before, and (b) shows after the motion.

Embodiments are described below, by way of example only, with reference to FIGS. 1 to 7.

In accordance with an aspect of the present disclosure there is provided a method for cooperative stochastic positioning in a mobile environment executed by a processor in an object of interest, the method comprising: receiving position announcements transmitted wirelessly from a plurality of objects, the position announcements providing the current position data of the respective object in relation to a common coordinate system; discretizing the received position announcements to obtain a plurality of data groupings based upon a clustering criteria applied to the received position data; performing clustering of the data groupings to determine which cluster datasets from the data groupings provide sufficient and consistent position accuracy to determine a relative position of the object of interest; applying stochastic automata model to selected cluster dataset to evaluate relative cluster weights in order to determine the relative position of the object of interest; and updating accuracy of a current position of the object of interest based upon determined relative position.

In accordance with another aspect of the present disclosure there is provided a system for cooperative stochastic positioning in a mobile environment the system comprising: a first receiver for receiving positioning announcements from a plurality of objects, the position announcements providing the current position data of the respective object in relation to a common coordinate system; a processor coupled to the first receiver; and a memory comprising instructions for execution by the processor, the instructions comprising: discretizing the received position announcements to obtain a plurality of data groupings based upon a clustering criteria applied to the received position data; performing clustering of the data groupings to determine which cluster datasets from the data groupings provide sufficient and consistent position accuracy to determine a relative position of the object of interest; applying stochastic automata model to selected cluster dataset to evaluate relative cluster weights in order to determine the relative position of an object of interest; and updating accuracy of a current position of the object of interest based upon determined relative position.

In accordance with yet another aspect of the present disclosure there is provided A computer readable memory providing instructions for performing cooperative stochastic positioning in a mobile environment, the when executed by a processor in an object of interest performing the method comprising: receiving wirelessly, position announcements transmitted from a plurality of objects, the position announcements providing the current position data of the respective object in relation to a common coordinate system; discretizing the received position announcements to obtain a plurality of data groupings based upon a clustering criteria applied to the received position data; performing clustering of the data groupings to determine which cluster datasets from the data groupings provide sufficient and consistent position accuracy to determine a relative position of the object of interest; applying stochastic automata model to selected cluster dataset position to evaluate relative cluster weights in order to determine the relative position of the object of interest; and updating accuracy of a current position of the object of interest based upon determined relative position.

The present disclosure provides a method and system for accurate positioning in a mobile environment using positioning information cooperatively from objects in the relative area. The disclosure is applicable to implementations of advanced safety vehicular applications but also equally applicable to any environment where objects are mobile and position data is required. In response to the immanent need for higher accuracy and integrity, a simple stochastic approach is provided that can improve and enhance vehicular or object positioning.

Suppose in an environment, objects are moving freely in any direction in space. At any point the position or location of all objects, as described in FIG. 1a objects moving within an environment are shown at an instance in time 110. At a second instance in time 120 the position of the objects can be at different positions as described in FIG. 1b. At any given point in time each object is located in a unique position defined by three coordinates $\Lambda_i=(x_i, y_i, z_i)$ relative to a known absolute (or relative) position. It should be noted that the selected set of coordinates could be angular, Cartesian, or any other coordinate system. The coordinate system may be defined based upon the type of object and the environment in which positions determination is required. For example, vehicles may use GPS where as packages may use coordinate system defined relative to a building structure.

Discrete Time Announcements

Assume that many objects are announcing, via a wireless technology, their positions to the best of their knowledge to be $\Lambda = \{\Lambda_1, \Lambda_2, \ldots, \Lambda_n\}$. Then assume that the Object-of-Interest (OOI), as shown in FIG. 1, either knows its position, but is interested in utilizing the available information to improve its accuracy, or completely unaware of its position. The disclosed system and method provides the OOI with the ability to better define, or improve knowledge about, its position. This can be achieved by finding $\Lambda_{OOI}$ at time (t) and timing accuracy ($\zeta$), and with the highest positioning accuracy possible (minimum $\Delta\Lambda_{min}$).

This would be quite easy if OOI can calculate the distance (distances between objects are typically called range) between itself and each of the objects announcing their positions. In other words, the set of ranges $\mathcal{R} = \{\mathcal{R}, \mathcal{R}, \ldots, \mathcal{R}\}$ define the range of OOI to each of the announcing objects $OX_1$ to $OX_7$. Therefore, if $\Lambda$ and $\rho$ are both available at time (t) (timing accuracy $\zeta$), a simple multi-lateration would be possible and a simple Euclidean math would lead us to the solution. Even if the distances between all objects are too long, corrections to the Euclidean math are known to fix those errors. For clarity $\rho_i$ is the projection of the range between OOI and object OXi on the set of chosen coordinates and can be written as $\mathcal{R}_i=(\rho x_i, \rho y_i, \rho z_i)$. Now a typical mathematical approach can be simplified as follows:

Knowing the sets:

$$\Lambda=\{\Lambda_1,\Lambda_2,\ldots,\Lambda_n\} \ \& \ \mathcal{R} = \{\mathcal{R}_1, \mathcal{R}_2, \ldots \mathcal{R}_n\}; \quad (1)$$

The exact coordinates of OOI ($\Lambda_{OOI}=(x_{OOI}, y_{OOI}, z_{OOI})$) can be obtained as $$x_{OOI}=f(\Lambda, \mathcal{R}) \ y_{OOI}=f(\Lambda, \mathcal{R}) \ z_{OOI}=f(\Lambda, \mathcal{R}) \quad (2)$$

Unfortunately, a set of inherent practical limitations lead to the following:

i. The correct definition of $\Lambda_i$ would be:

$\Lambda_i=(x_i+\delta x_i, y_i+\delta_i, z_i+\delta z_i)$ where ($\delta x_i$, $\delta y_i$, and $\delta z_{u_i}$) are the projected errors in estimated position of object i (OOI), and that each $\delta$ is a range (positive to negative). The error ($\delta$) is an indication of the accuracy of equipment used and the time since last accurate position was measured. Errors in $\Lambda_i$ may or may not be projected for each coordinate. Yet, since error values are relatively small compared to $(x_i, y_i, z_i)$ and the range $(\rho x_i, \rho y_i, \rho z_i)$, if the error in estimated position is not available for each coordinate, a simple approximation can be obtained by assuming the Euclidian vector of the error.

ii. Assuming that the OOI can build some sort of confidence in the announced position $\Lambda_i$ received from a particular object, lets' call that $\epsilon\Lambda_i$. Now it is important to distinguish $\epsilon\Lambda_i$ from $\delta\Lambda_i$. For one, the value of $\epsilon\Lambda_i$ represent the infinite range (0-1) where zero indicates no confidence and one indicates complete confidence. By that, $\epsilon\Lambda_i$ indicates a level of trust in the received information. Should an object attempt to deceive a group of objects to build wrong conclusion on their position, $\epsilon\Lambda_i$ can capture that in different ways. As an example, OOI may develop a lower confidence value in $\Lambda_i$. ($\epsilon\Lambda_i$<9.0 e 20) if the object i (OOI) position information arrived missing security credentials. Further, an object that continues to announce position information that reflect lower information quality from other objects will get diminishing value for $\epsilon\Lambda_i$. Alternatively, objects that continue to announce information that fits the collective sense gathered compared to other objects will get increasing $\epsilon\Lambda_i$.

iii. During the calculation of the range $\rho i$, each range should have been presented as:

$\mathcal{R}_i=(\rho x_i+\delta\rho x_i, r\rho_i+\delta\rho y_i, \rho z_i+\delta\rho z_i)$ where ($\delta\rho x_i$, $\delta\rho y_i$, and $\delta\rho z_i$) are the projected errors in estimated range of object i (OOI), and that each $\delta$ is a range (positive to negative). The error is an indication of the accuracy of equipment used. Errors in $\rho i$ may or may not be projected for each coordinate. Yet, since error values are relatively small compared to $(x_i, y_i, z_i)$ and the range $(\rho x_i, \rho y_i, \rho z_i)$, if the error in estimated range is not available for each coordinate, a simple approximation can be used by assuming the Euclidian vector of the error.

The stochastic solution for positioning problem has the following characteristics:

1) If the number of objects announcing their position (n) is too low, the accuracy of the stochastic approach would suffer. Similarly, if (n) is too high, it is better to focus the stochastic solution on the best trusted, closer objects with minimum chances of errors. The system and method includes built-in measures to monitor the upper and lower limits for (n).
2) The distribution of the confidence in a particular measure $\epsilon \Lambda_i$ is dynamic, and follows a feed forward approach. This requires maintaining a history of previous nodes accuracy, and therefore, makes the algorithm memory demanding.
3) The method design strongly guards against attacks; at least (½ n) must provide (consistent) malicious information before the OOI would show some signs of lower accuracy. Even in that case, it is fairly simple to predict malicious objects and isolate them. In other words, it is extremely difficult to mislead the method by faking invalid position messages.
4) By just listening to exchanged messages within the environment, the OOI can draw pretty accurate image about its existence.

As illustrated, the system and method provides higher accuracy by merely utilizing available information. It may require fairly large memory storage, but has been proven to show strong resilience to malicious attacks.

Figure 2:
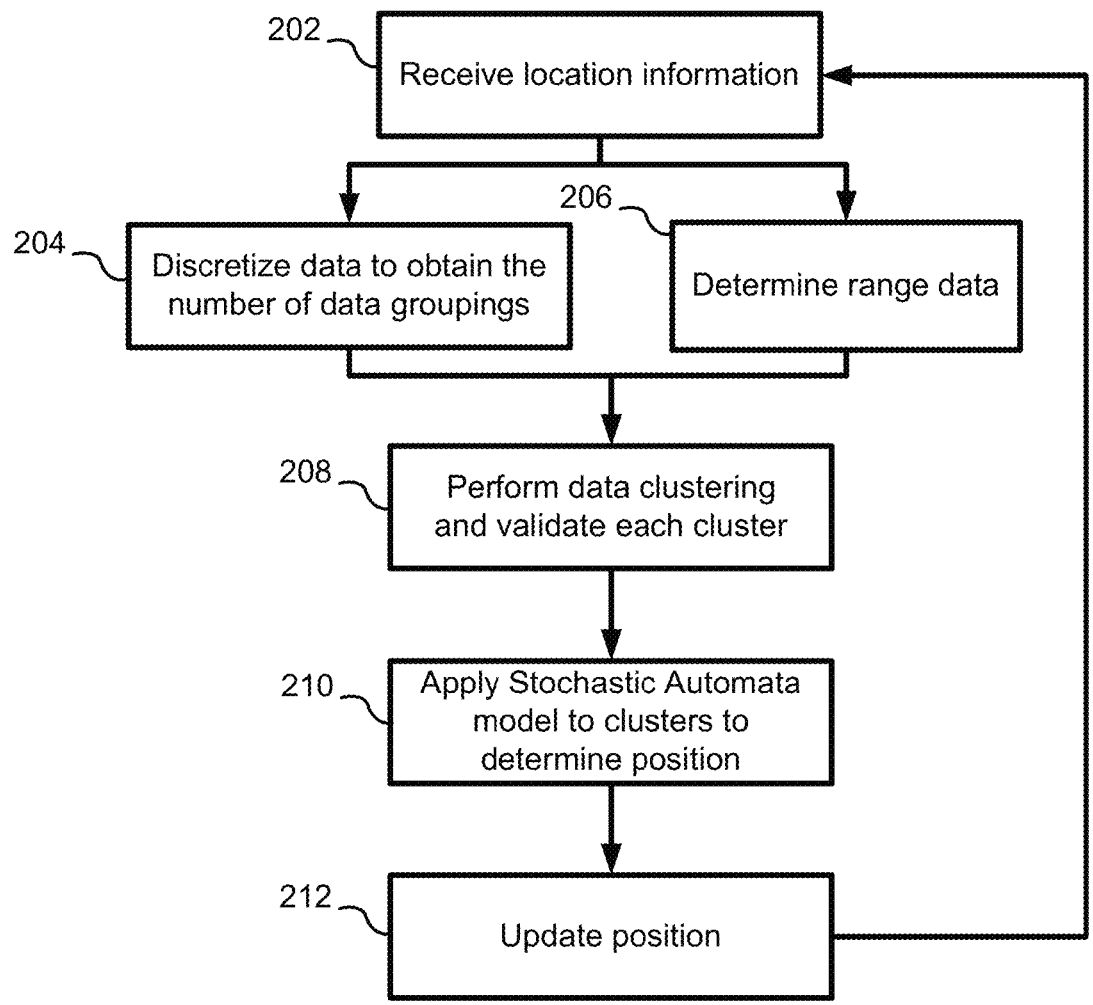
FIG. 2 shows a method for cooperative stochastic positioning in a mobile environment.

FIG. 2 shows a method for cooperative stochastic positioning in a mobile environment. The method is implemented in a receiving or primary object to aid in improving the accuracy of the location of the object. The object of interest receives position information (202) wirelessly for other object in the immediate area. The position information defines each objects current location data relative to a standard coordinate system, such as for example GPS. The received data can be discretized into a number of clusters (204) based upon a chosen criteria such as for example time varying frequency relative to the arrival times of the position information. Ranging information can also be simultaneously determined (206) and associated with the received position information. The ranging information can be determined by the receiver of the positioning information or simultaneously determined by other ranging technologies and correlated with the received position information. Alternatively the ranging information can be generated by applying a channel propagation model to the received position information. Data clustering is then performed (208) on each cluster to classify the clusters into competing data sets based upon the chosen criteria. The criteria may also be associated with previous accuracy of location information provided by an object. For example objects that have previously provided low accuracy data may be clustered together or weighted differently in the cluster datasets. Clusters that provide sufficient accuracy within a defined distance can than be processed using a stochastic automata model (210) to perform multi-lateration to determine a more accurate position of the object of interest. The objects position can then be updated based upon the determined position (212) and the process continues at (202) for the next set of received position data.

Figure 3:
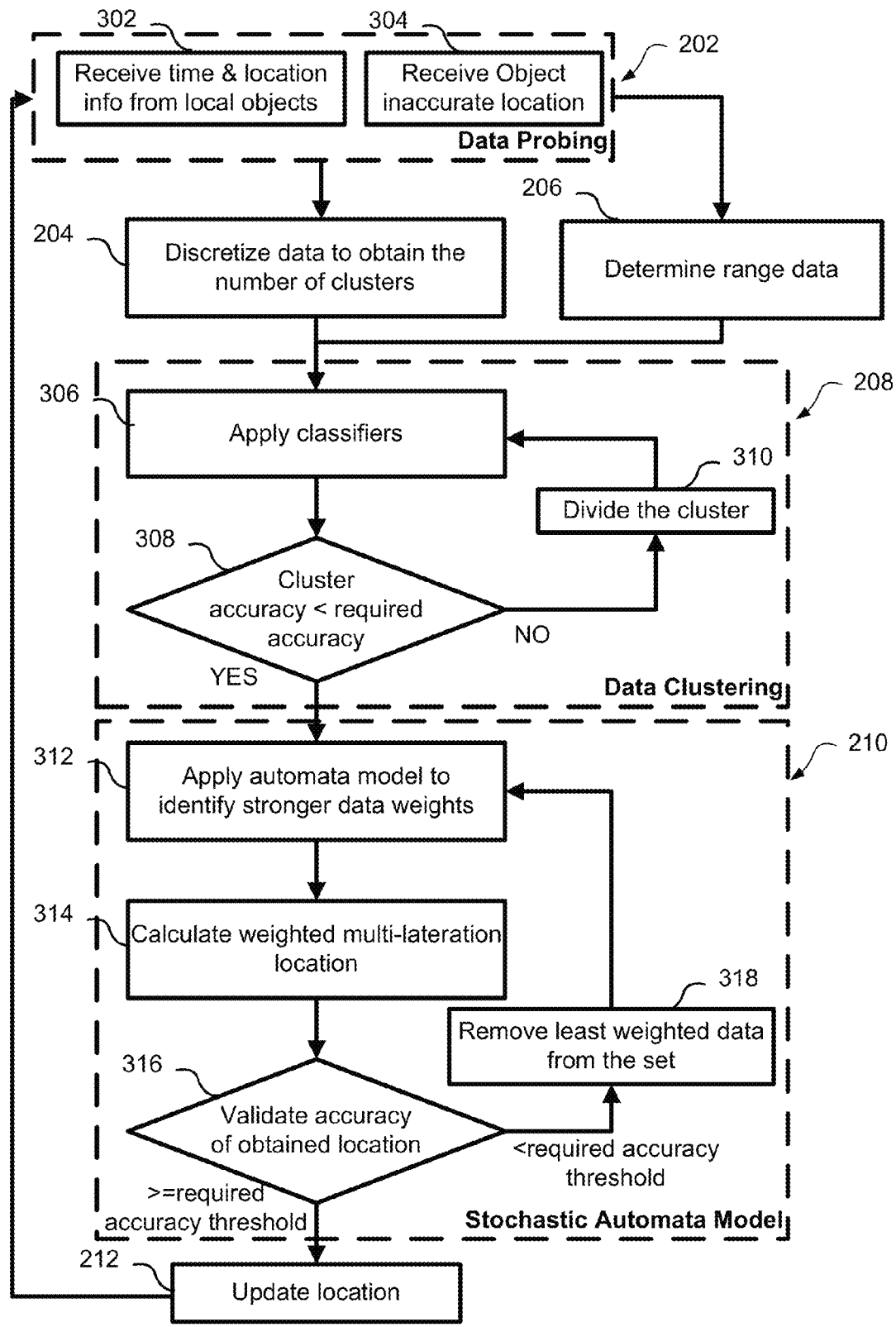
FIG. 3 shows a detailed method for cooperative stochastic positioning in a mobile environment.

FIG. 3 shows a detailed method for cooperative stochastic positioning in a mobile environment. The method is implemented in a receiving object to aid in improving the accuracy of the position of the object. The object receives position information (202) for other object in the immediate area. The position information defines each objects current position data relative to a standard coordinate system, such as for example GPS. The received information contains time and position information (302), however the information can be possibly inaccurate information or unavailable altogether (304). The received data can be discretized into a number of groupings (204) based upon time varying frequency relative to the arrival times of the position information. Ranging information can also be simultaneously determined (206) and associated with the received position information. The ranging information can be determined by the receiver of primary object or simultaneously determined by other ranging technologies and correlated with the received position information. Alternatively the ranging information can be generated by applying a channel propagation model to the received position information. Data clustering is then performed (208) on each cluster to classify the clusters into competing data sets. Classifiers are applied to the determined clusters (306) based on the selected clustering criteria. For each cluster, if the accuracy of the cluster is less than the required accuracy outside a defined threshold, (NO at 308), the cluster can be divided (310) and classifiers applied (306). For clusters that provide sufficient accuracy within a defined threshold, (YES at 308), they can than be processed using a stochastic automata model (210) to perform multi-lateration to determine a more accurate position. A stochastic automata model can then be applied (312) to the clusters to identify stronger data weights in the position data. The weighted multi-lateration position can be calculated using the weighted position data (314). The calculated position data can then be validated (316) against the existing position data of the primary object. If the calculated position data is less than an accuracy threshold (<required accuracy threshold at 318), the least weighted data set can be removed from the data (318). If the data provides sufficient accuracy (>=required accuracy at 318) the objects position can then be updated (212) and the process continues at (202) for the next set of received position data.

Continuous Time Announcements

It would be ideal if the OOI receives position announcements from all (n) objects at discrete time points. Unfortunately, this is impossible. Objects are expected to announce their positions sporadically and randomly. Therefore, the method discretizes the available information at a time varying frequency. Since discretizing available information would involve extrapolation, it can affect accuracy. The effect on position accuracy can be accommodated by updating δ values. The method must also make a decision on the best time to recalculate position.

Assuming the Last-Known-Accurate-Position (LKAP) is $\Lambda_0 = (x_0, y_0, z_0)$, and given the position expectation at the next point $\Lambda_1 = (x_1, y_1, z_1)$, the OOI would discretize available information if the time since $\Lambda_0$ exceeds mζ, or if the estimated errors in $\Lambda_1$ contradicting available information exceeds acceptable tolerance. This system and method provides ways to mitigate the timing granularity effect mζ and to decide when to re-evaluate the new position Λ.

Channel Propagation Model

Figure 4:
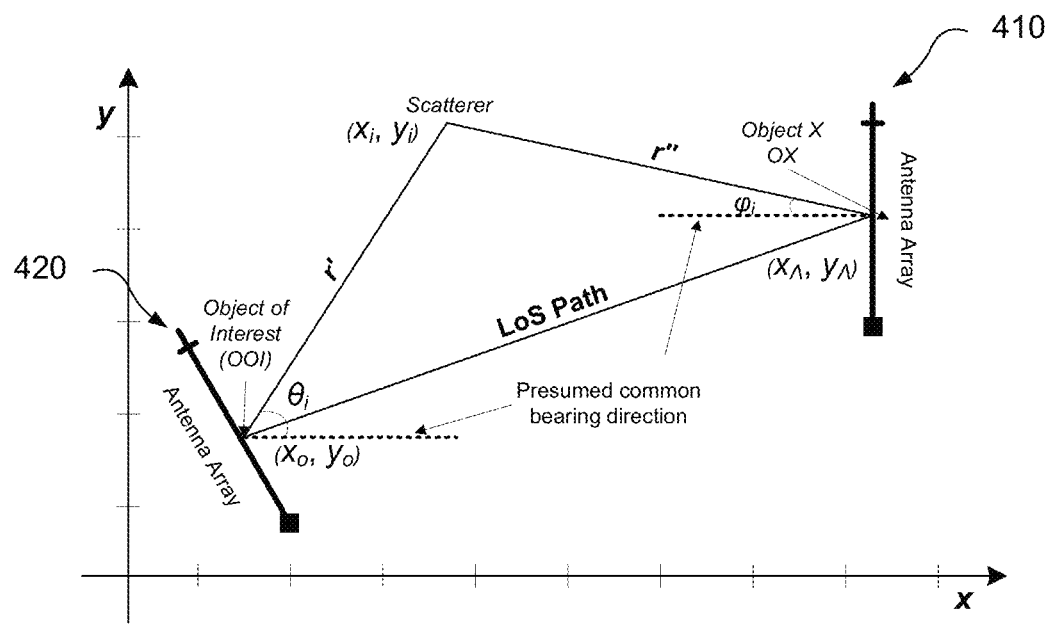
FIG. 4 shows a representation of an example of multi-path propagation channel model.
Figure 5:
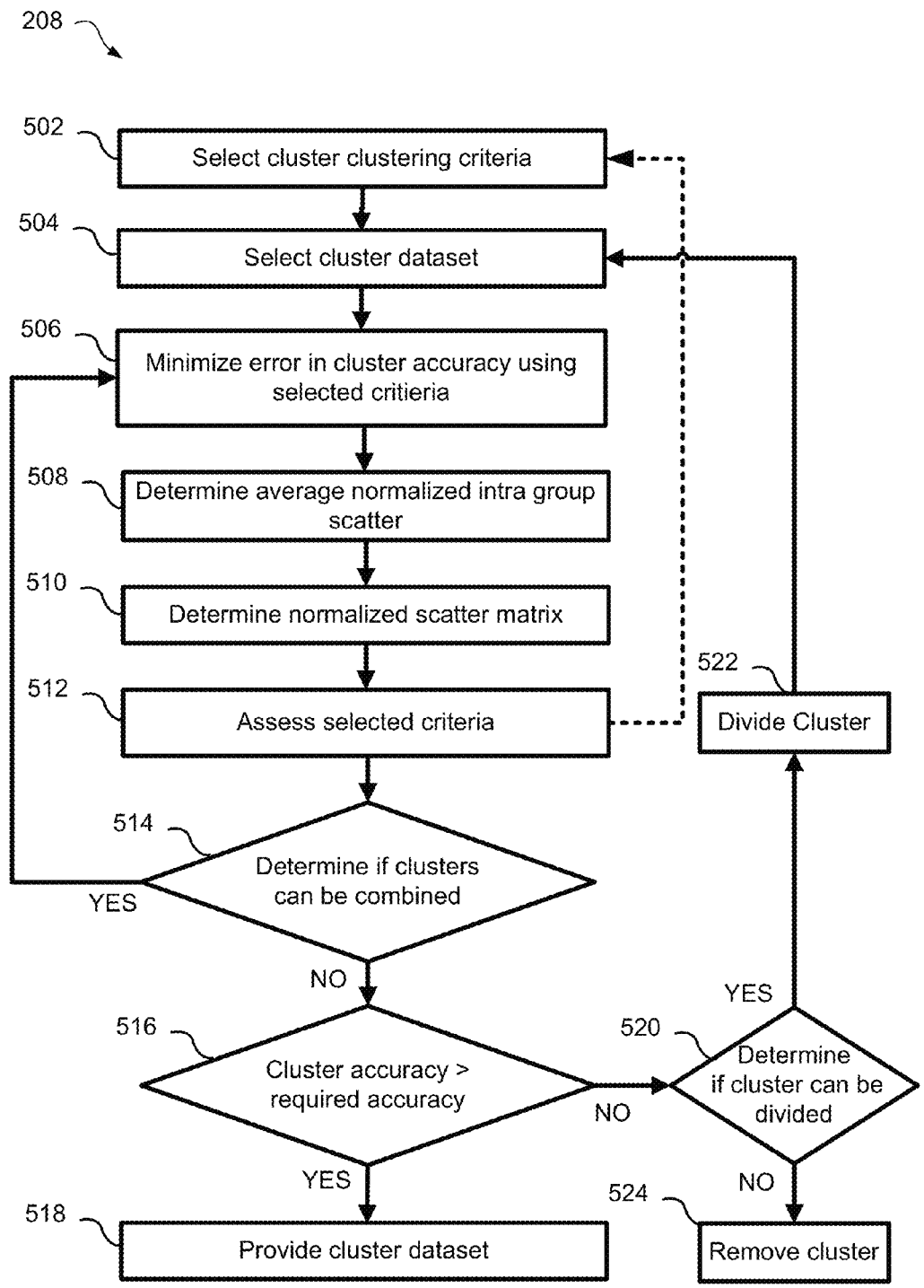
FIG. 5 shows method for performing Advanced Fuzzy Clustering Algorithm.

Assume a wireless signal has N resolvable propagation paths between the transmitter and receiver. Since each reflector propagates multiple signals, and there are potentially have multiple reflected signals, the strongest reflected signal is selected. The multipath signal parameters used are: Angle of Departure (AoD $\phi_i$), Angle of Arrival (AoA $\theta_i$), and delay of Arrival (DoA $\tau_i$). All of ($\phi_i$, $\theta_i$, and $\tau_i$) can be measured using any available technique with respect to common bearing direction. Then, as illustrated in FIG. 4, let $(x_A, y_A)$, $(x_o, y_o)$, and $(x_i, y_i)$ be the true position of, respectively, the signal source 410, the object of interest 420, and the ith reflective point where $(x_o, y_o)$, and $(x_i, y_i)$ are unknown. Let $\rho'_i$, $\rho''_i$ be the lengths of the segments forming the ith path respectively. Finally, let $\phi_i$ and $\theta_i$ be the angles of departure and arrival for the ith path from the source 410 to the object of interest 420.

From FIG. 4, $\phi_i$ and $\theta_i$ are obtained as a function of the locations of the mobile target and the reflection point.

$$\theta_i(x_o, y_o, x_i, y_i) = \arctan\left(\frac{y_i - y_o}{x_i - x_o}\right) \quad (3)$$

$$\varphi_i(x_o, y_o, x_i, y_i) = \arctan\left(\frac{y_i - y_s}{x_i - x_s}\right)$$

Equation 3 applies for $l=1, \ldots, N$. Then assuming c is the, corrected, propagation speed, the Time Difference of Arrival (TDoA) can be determined by:

$$\tau_i(x_o, y_o, x_i, y_i) = \left(\frac{\rho_i - \rho_1}{c}\right) \quad (4)$$

and $$i = 2, \ldots, N$$

where $\rho_i = \rho'_i + \rho''_i$, and:

$$\rho'_i = \sqrt{(x_i - x_o)_2 + (y_i - y_o)^2}$$

$$\rho''_i = \sqrt{(x_i - x_s)^2 + (y_i - y_s)^2} \quad (5)$$

Since the unknown position $(x_o, y_o)$ needs to be obtained from the known position $(x_\Lambda, y_\Lambda)$, given the uncertainty in $(\hat{\phi}_i, \hat{\theta}_i, \text{ and } \hat{\tau}_i)$, The expected statistical error in measuring $(\phi_i, \theta_i \text{ and } \tau_i)$ is applied such that:

$$\hat{\tau}_i = \tau_i(x_o, y_o, x_i, y_i) + n_{\tau_i}$$

$$\hat{\theta}_i = \theta_i(x_o, y_o, x_i, y_i) + n_{\theta_i}$$

$$\hat{\phi}_i = \phi_i(x_o, y_o, x_i, y_i) + n_{\phi_i} \quad (6)$$

where $(n_{\phi_i}, n_{\theta_i}, \text{ and } n_{\tau_i})$ are the statistical errors, $i=1, \ldots, N$ for $\hat{\phi}_i$ and $\hat{\theta}_i$, but $i=2, \ldots, N \hat{\tau}_i$.

Therefore, when the number of paths $N \geq 3$, $(3N-1)$ measurements and $(2N+2)$ unknown parameters are determined. The problem yields a non-linear estimation problem that can be solved using machine learning or stochastic learning automata. Using a stochastic learning automata all nodes cooperate to arrive to better relative ranging. Therefore, the collective behavior of the selected set of nodes, or a cluster, are guaranteed to converge, since the accumulation of relative distances will naturally tend to marginalize low accuracy ranging in favor of the multiplicity of better accuracy ranging. Further, since the boundaries of the selected set of nodes (a cluster of nodes) are finite, the problem lends itself to deterministic finite automata. In the following section the formulation of the automata model is disclosed.

The approach used in this section defines a way to handle wireless channel propagation model that is efficient for many wireless technologies, but remain isolated from the stochastic method. Manufacturers might use alternate approaches to calculate the range between OOI and OX. The method that is illustrated here is given to show the use of non-Cartesian coordinates with the stochastic approach. Alternative approaches can be used for instance, using an infrared ranging method combined with the disclosed stochastic approach that utilizes the calculated ranges but not to the ranging method in itself.

Clustering

A soft classifier is utilized to split the set of input values $\Lambda$ into competing sets or clusters. Each set of $\Lambda$ would include closer consistency in its parameters. In other words, elements of a set $\Lambda_a$ when combined together, they end up with a crisp value for $\Lambda_{OOI}$ that has the following features:

1—All elements of $\Lambda_a$ can be used to find $\Lambda_{OOI}$ with accuracy $<= \Delta\Lambda$ at time (t) and timing accuracy ($\zeta$).

2—Elements that violate the previous condition may join $\Lambda_b$, where all elements of $\Lambda_b$ can be used to find $\Lambda_{OOI}$ with accuracy $<=\Delta\Lambda$ at time (t) and timing accuracy ($\zeta$). Same applies to compute $\Lambda_c, \Lambda_d, \ldots$ and so on.

3—At the end, the remaining a set of elements will represent elements that would together violate the required accuracy measures. Those elements are ignored or used for swapping only.

The above mentioned function can be achieved by applying fuzzy classifiers, rough sets, neural networks, or other similar classifiers. As disclosed in FIG. 5, one classifier method is an Advanced Fuzzy Clustering Algorithm (AFCA) that performs the required classification to performing data clustering (308).

The method commences with the selection of clustering criteria (502) such as least-mean-square (LMS), arrival delay, data confidence or any other grouping criteria that can be utilized inferable from the received position data. The clustering criteria may also be associated with previously data received from an object to determine an accuracy of the data. In such a case a confidence interval may be assigned to position information or other characteristics to define accuracy of the data. Based upon the configuration of the system, the criteria may be fixed, for example during startup of the system or may provide multiple criteria options that are selected when a particular criteria for clustering does not provide accurate results and the method reinitiated, The cluster data set are selected (504) from the data grouping based upon the chosen criteria. The selected criteria is then used to minimize error in cluster accuracy (506) by switching one data position within the cluster at a time. This can be performed for example by, letting the given data set consist of N data points, denoted by the vectors:

$$X_i = \begin{bmatrix} x_{i1} \\ x_{i2} \\ \vdots \\ \vdots \\ x_{ip} \end{bmatrix} \quad (7)$$

Where $i=1, 2, \ldots, N$. The AFCA classifies the data into R disjoint groups $\theta_1, \theta_2, \ldots, \theta_R$, according to a certain selected criterion. In order to elaborate this point, assuming the center of gravity of the total vectors being at the origin, i.e., equation 3 can be converted to:

$$\overline{X} = \frac{1}{N}\sum_{i=1}^{N} X_i = 0 \quad (8)$$

Otherwise, a transformation from $X_i$ to $\overline{X}$ requires that the transformed pattern satisfies equation 8, and the normalized total scatter matrix T based on $\theta$ is given by:

$$T = \frac{1}{N}\sum_{i=1}^{N} X_i X_i^t \quad (9)$$

Where the superscript t, indicates a transposed matrix, and the normalized intra-group scatter for class $\theta_j$ is:

$$\Gamma_j = \frac{1}{N_j}\sum_{x_i \in \theta_j} (X_i - \overline{X}_j)(X_i - \overline{X}_j)^t \quad (10)$$

Where $N_j$ is the number of vectors in group $\theta_j$, and:

$$\overline{X}_j = \frac{1}{N_j}\sum_{x_i \in \theta_j} X_i \quad (11)$$

Therefore, the average normalized intra-group scatter (508) for the total data set $\theta$ is:

$$\Gamma = \sum_{j=1}^{R} p_j \Gamma_j \quad (12)$$

Where $p_j = N_j/N$ and the normalized intra-group scatter (510) is given by:

$$B = \sum_{j=1}^{R} p_j \overline{X}_j \overline{X}_j^t \quad (13)$$

Therefore, the following matrix identity is defined:

$$T = \Gamma + B \quad (14)$$

Since different data criterion that can be expressed in terms of matrices T, $\Gamma$, and B, a chosen criteria to minimize is:

$$S_0 = tr\Gamma = \sum_{j=1}^{R} \sum_{x_i \in \theta_j} \|X_i - \overline{X}_j\|^2 \quad (15)$$

Where $\|\ldots\|$ is the Euclidean norm and $tr\,\Gamma$ is the trace of $\Gamma$. It is noted that $S_0$ is only invariant under an orthogonal transformation of the data space, and the AFCA method based on $S_0$ is most appropriate for fairly concentrated clusters. The two clustering criteria which are invariant under any linear non-singular transformation are to maximize:

$$S_1 = \frac{\det T}{\det \Gamma} = \sum_{k=1}^{p}(1+\lambda_k) \quad (16)$$

$$S_2 = \det\Gamma^{-1} B = \sum_{k=1}^{p} \lambda_k \quad (17)$$

Where $\lambda_k$, $k=1, 2, \ldots p$ are the eigenvalues of the matrix $\Gamma^{-1}B$. However, the AFCA clustering algorithm is based on the three criteria and cannot have reasonable performance and computational complexity simultaneously. It is easy to show that under a normalizing transformation of the data space, any alternative criteria is suboptimal, i.e. when $$X \rightarrow Z = AX \quad (18)$$

Where A is a linear non-singular transformation matrix such that $$ATA^t = I \quad (19)$$

The elaborated criterion demonstrate that the criterion $S'_0$, which is the criterion $S_0$ after the normalizing transformation of equation 18 is applied, has the advantages of both optimum performance and low computational complexity compared to the criteria $S_0$, $S_1$, and $S_2$.

For presentational purposes only, the least-mean-square (LMS) criterion is used. The main advantages of this criterion are that the method is invariant under any linear non-singular transformation and classification can be done by either a linear or a generalized linear machine. Yet it is important to indicate that the AFCA may use alternative $S'_0$ criterion especially when clusters are not close to equi-probable like the case with the short-range signal. Now let:

$$\Phi(X) = [\Phi_1(X), \Phi_2(X), \ldots, \Phi_q(X)]^t \quad (20)$$

Where $\Phi_i(X)$, $i=1, 2, \ldots, q$, are linearly independent, real, single-valued and continuous functions of the components of X. The corresponding Euclidean space of $\Phi(X)$, is $E^q$. The LMS criterion is to minimize the quantity:

$$h(M) = \frac{1}{2}\sum_{j=1}^{R} p_j E_j \|M\Phi(X) - \alpha_j\|^2 \quad (21)$$

Where M is an (R−1)×q weight matrix, $\alpha_j$, $j=1, 2, \ldots R$, are the reference points with the properties that:

$$\|\alpha_j\| = 1 \quad (22)$$

$$\alpha_j^t \alpha_k = \frac{1}{R-1}, j \neq k \quad (23)$$

$$\|\alpha_j - \alpha_k\| = \|\alpha_j - \alpha_i\|, \text{ and} \quad (24)$$
$$i \neq j \neq k = 1, 2, \ldots, R$$

And $E_j$ is the expectation taken with the probability distribution of X's in group $\theta_j$. The selected criteria can then be assessed (512) to determine if it should be tightened/loosened or if additional clustering criteria should be selected with the method restarting at (502) to select new clustering criteria, (204) in FIG. 2, if a new criteria is to be used. It can then be determined if clusters can be combined (514) if the data provided by each cluster is within a defined position accuracy relative to the defined coordinate system, for example 20 mm. If clusters can be combined, (YES at 514), the clusters are both within the desired accuracy, the selected criteria can be used to minimize error of the combined cluster (506). If the clusters can not be combined, (NO at 514), with each other based upon relative position accuracy, it is then determined if the cluster accuracy is within the required accuracy (516) of the system. If the cluster is within the required accuracy, for example 20 mm of the known position, (YES at 516), the cluster can then be provided to the stochastic automata (518). If the accuracy is not within the required accuracy (NO at 516), it is then determined if the cluster can be divided (520) based upon the relative accuracy of the cluster data. If the cluster can be divided (YES at 520), the divided cluster is provided to select the dataset and clustering criteria (504). If the cluster cannot be divided (NO at 520), the cluster is removed (524). This process is repeated until all the data is analyzed, the position data either being included in a cluster that is passed to the stochastic automata or removed from the dataset.

The following sections describe the core stochastic method for calculating $\Lambda$.

Formulation of Automata Model

A classical deterministic finite automata problem is summarized, and then, the stochastic automaton is formulated that is considered in mobile environment situations. Alternative approaches can be used to calculate the range or classify calculated ranging information. Yet, the stochastic approach defined in this section and the following sections apply on how to calculate the high accuracy position of OOI. A zero sum is desired where all cooperative nodes (or participants) continuously reinforce lower square law. The next round of readings to restart the competition. Therefore, there will be a way to stop the competition or to indicate the point of departure.

The finite deterministic automaton is defined by a quintuple $\{\Lambda, \mathcal{R}, \phi, g, h\}$, where $\Lambda$ is the set of position inputs, $\mathcal{R}$ is the set of estimated ranges, and $\phi$ is the set of confidence values where the higher the confidence the better. The set $\phi$ is treated as a discrete set of states by enforcing disconnected steps of 0.10, and therefore, maintains a finite state. The corresponding lowercase letters denotes members of the defined sets (e.g., $\lambda_i$, $\rho_i$, and $\phi_\alpha$). Now g is the output function, and therefore, $\rho(t)=g[\phi(t)]$. Similarly, the next-state function $\phi(t+1)=h[\phi(t), \lambda(t+1)]$. The next equation is the canonical equation for finite automaton. Restricting the input set to two values, 0 and 1 respectively, called non-penalty and penalty where the penalty applies if the position exceeds certain threshold from the expected position. Therefore, I set $\lambda_1=0$ and $\lambda_2=1$. Finally, the random medium can be described by: $C=C(p_1, p_2, \ldots, p_k)$, where:

$$p_\alpha = Pr[\lambda(t+1)=\lambda_2 | \rho(t)=\rho_\alpha] \quad (25)$$

Since the input to the automaton at instant (t+1) is the output of the medium at instant t. When $p_\alpha$s are constant, a stationary random state is defined. The state function h determines the learning behavior of the automaton. With suitable choice of h, the average penalty of the automaton decreases with time to an asymptotic value.

The stochastic automaton is defined by the sextuple $\{\Lambda, \mathcal{R}, \phi, g, \Pi, T\}$. Similarly, $\Lambda$ would be the set of two inputs (1 and 0:1 for penalty and 0 for non-penalty), $\mathcal{R}$ is the set of estimated $\rho$ ranges, $\phi$ is the set of states, g is the output function $\rho(t)=g[\phi(t)]$ which is one-to-one deterministic mapping from state set to the output set. Now, since the number of outputs equals the number of states, the vector $\Pi$ is the state probability vector and $\Pi(t)=(\Pi_1(t), \ldots, \Pi_1(t))$ controlling the choice of the state and hence the output at instant t. Therefore, the state $\phi_i$ would be chosen at instant t with probability:

$$\prod_i (t), \sum_{i=1}^{r} \prod_i (t) = 1 \quad (26)$$

Finally, T defines the reinforcement scheme which drives $\Pi(t+1)$ from $\Pi(t)$. This can be simplified as:

$$\Pi(t+1)=T[\lambda(t),\phi(t)]\Pi(t) \quad (27)$$

Where T is not an explicit function of t, but t is the discrete-time parameter. Depending on the previous action and the environmental response to the action taken, the reinforcement scheme changes the probabilities controlling the choice of the state at the next-round. With suitably designed reinforcement scheme, the average penalty tends to decrease with time. This guarantees a conversion with relative ranging in a stationary state. However, in a dynamic environment, the timing may not be enough to reach sufficiently low average penalty. This can be mitigated by decreasing the time granularity to increase the number of rounds. Computational cost here is pretty minimal, and it is considered a good extension for this research.

In order to perform the linear and nonlinear reinforcement you need to consider the effect of environmental mobility on the performance of the proposed stochastic automaton. This resembles pretty much the operations of adaptive controller in a mobile environment. The stochastic state probabilities are continuously altered according to a reinforcement scheme in response to penalties received from the environment. The automaton adapts by reducing the average penalty. Periodic perturbations of penalty strengths are used as test-singles to drive analytic expressions describing the tracking behavior or the automaton operating under a linear reinforcement scheme. It can be proven that the parameters that determine the ability of a stochastic automaton to track the, perceived, mobility of the environment are the Eigen-values of the transition matrix $R(\alpha, \beta)$ as illustrated later.

Therefore, changes in the environment are reflected as perturbations in the asymptotic state probability values of the automaton. In this manner, the automaton is said to track the environment. However, as the perturbation frequency ($\epsilon$) increases to such an extent that the automaton starts responding to the average value of perturbed parameter, then the automaton loses the ability to track. Hence, it is important to express the upper limit of the perturbation frequency ($\epsilon_u$) which keeps the automaton tracking the environment mobility. These limits are expressed as functions of the Eigen-values of the transition matrix $R(\alpha, \beta)$. The Eigen-values also determine the correlation between any two state probability values separated by a number of transition intervals. The smaller the correlation, the higher is the upper limit ($\epsilon_u$). For the purpose only on the square law reinforcement scheme is discussed which can be defined as follows. If $\phi(t)=\phi_i$, in other words if $\rho(t)=\rho_i$, then:

$$\prod_i (t+1) = \prod_i^2 (t), \quad \text{if } \lambda = 1 \quad (28)$$

$$\prod_i (t+1) = 1 - \sum_{j \neq i} \prod_j^2 (t), \quad \text{if } \lambda = 0$$

and $\forall j \neq i$; $\quad (29)$ $$\prod_j (t+1) = \prod_j (t) + \frac{\prod_i (t) - \prod_i^2 (t)}{r-1}, \quad \text{if } \lambda = 1$$

$$\prod_j (t+1) = \prod_j^2 (t), \quad \text{if } \lambda = 0$$

Using this reinforcement, the steady-state performance of the automaton can be summarized as follows:

$$\text{if } p_i < \frac{1}{2}, p_j > \frac{1}{2}, \therefore j \neq i \tag{30}$$

Also the vector $\Pi^{(i)}$, which is defined by $\Pi_i^{(i)}=1$ and $\Pi_j^{(i)}=0$, where $j \neq i$, would control the choice of states at the steady state. Therefore, the automaton actually chooses the probability of the state corresponding to the lowest penalty probability. This is promoted as the best possible performance. In this case, the automaton will be said to perform optimally, given that the state is assumed stationary at each value of t. If however, all $p_i > \frac{1}{2}$, the stable state probability vector defining the choice of states asymptotically. Then, by reapplying Eigen-values on the transition matrix as performed before, and following the same approach to a great degree of accuracy by $\Pi^*$, where:

$$\prod_i^* = \frac{\frac{1}{2p_i - 1}}{\sum \frac{1}{2p_j - 1}} \tag{31}$$

Equation 31 is valid when the number of states is two. From the same equation it can be derived that the state corresponding to a lower penalty probability has higher probability of being chosen. This performance is referred to as expedient. In the case when more than one $p_i < \frac{1}{2}$, it leads to a situation where suboptimal performance is possible and might converge, it can only happen if a major malicious attack has been attempted successfully on too many objects. However, it is highly unlikely that so many objects can be led to invalid $p_i$ unless the entire system stops for a long period that is much higher than ($\epsilon_u$). Since this situation is practically unachievable, $\Pi^*$ will always converge.

Exploration of a Scenario

Now to run through a case showing how the competition process works, some definitions are introduced. For instance, the penalty of the preceding round can be called unit-loss while the non-penalty would be called unit-win. The ith output is identified and associated with the ith estimated range, therefore, $p_i$ is the probability of unit-loss based on range $\rho_i$, and $q_i = 1 - p_i$ is the probability of unit win for range $\rho_i$. In that sense, the winning node would define the correct absolute-coordinates. Further, winning ranges would define the second best set of relatively well-positioned nodes. Therefore, relatively well-positioned nodes can adjust their position estimate based on the winning node absolute-coordinates and winning ranges by using multi-lateration. Finally, badly positioned nodes are those nodes with subsequent unit-loss. They can fix their coordinates based on winning ranges from either the winning node or the well positioned nodes.

Let us consider two automata, $\Sigma^1$ and $\Sigma^2$ taking part in the competition process. The input $\lambda^j(t)$ of the automaton $\Sigma^j$ has two values $\lambda_1^j = 0$, i.e. a win, and $\lambda_2^j = 1$, i.e., a loss. If $\rho_j$ is the number of states for $\Sigma^j$, then, for the stochastic automata defined in the previous section, the number of ranges is also $\rho_j$, (i.e. ranges are $\rho_1^{(j)}, \rho_2^{(j)}, \ldots, \rho_{rj}^{(j)}$). Hence, if $Я(t)$ at time t is the set $\{\rho^{(1)}(t), \rho^{(2)}(t)\}$. The outcome of the round at time t would be the set $\Lambda(t+1) = \{\lambda^{(1)}(t+1), \lambda^{(2)}(t+1)\}$. A competition $\Gamma$ with automata $\Sigma^1$ and $\Sigma^2$ is defined if, for all sets $Я(t)$, the probabilities $P[Я(t), \Lambda(t+1)]$ of its outcomes $\Lambda(t+1)$ are given. In the usual meaning of the competition theory, the payoff functions $M^j(Я)$, j=1, 2, defining a competition $\Gamma^*$, denote the expectation of winnings for the jth node, the set of ranges being denoted by F, and are related to $P(Я, \Lambda)$ in the following way:

$$M^j(F) = \sum_{\lambda^{(i)}} \{P[F; \lambda^{(i)}, 0] - P[F, \lambda^{(i)}, 1]\}, i \neq j, \tag{32}$$

In a zero sum situation:

$$\sum_j M^j(F) = 0 \tag{33}$$

If at time t both automata $\Sigma^1$ and $\Sigma^2$ are in states $\phi_\alpha^{(1)}$ and $\phi_\beta^{(2)}$, the system is in state $(\alpha, \beta)$. If the $R(\alpha, \beta)$ represents the final probability of the system state being $(\alpha, \beta)$, then $W^i$, the expected value of the winning of $\Sigma^j$ is given by:

$$W^i = \sum_{\alpha, \beta} R(\alpha, \beta) M^j(f_\alpha^{(1)}, f_\beta^{(2)}), j = 1, 2 \tag{34}$$

This can be called the value of the two-node competition; a zero sum. The zero sums, for any round where $Я = (\rho^{(1)}, \rho^{(2)})$; is:

$$P(f^{(1)}, f^{(2)}; 1, 1) = P(f^{(1)}, f^{(2)}; 0, 0) = 0 \tag{35}$$

But if by $p_{ij}$ I define the probability that $\Sigma^1$ loses when the range $(\rho_i^{(1)}, \rho_j^{(2)})$ is employed and by $q_{ij} = 1 - p_{ij}$ the probability that $\Sigma^1$ wins for the same range, then, for this set of ranges, the expectation of winning $g_{ij}$ for $\Sigma^1$ is:

$$g_{ij} q_{ij} - p_{ij} \tag{36}$$

And hence, the rectangular matrix $[g_{ij}]$, $i=1, \ldots, \rho_1$; and $j=1, \ldots, \rho_2$; is the competition matrix.

Consider the competition between $\Sigma^1$ and another cluster of nodes that has a fixed range mix (note that the second cluster resembles the set of stationary roadside units). If the second cluster employs another learning automaton, it is fixed range mix would vary slightly over time as its reinforcement scheme alters the state probability. Also note that the alteration would reverse, and then keep oscillating, the reason is that the technique enforces discrete disconnected steps on $\phi$ to maintain the finite state of the system.) Let it use the jth range with probability:

$$m_j, \sum_{j=1}^{r_2} m_j = 1 \tag{37}$$

The $m_j$ do not depend upon the range chosen by $\Sigma^1$. If at the instance t the automaton $\Sigma^1$ chooses $\rho_i^{(1)}$, then the probabilities $q_i$ of a win by $\Sigma^1$ and $p_i$ of a loss by $\Sigma^1$ are given by:

$$q_i = \sum_{j=1}^{r_2} q_{ij}, m_j, \tag{38}$$

$$p_i = \sum_{j=1}^{r_2} p_{ij}, m_j$$

Hence, the expected winning for the ith range can be written as:

$$g_i = q_i - p_i = 1 - 2p_i \tag{39}$$

Which is identical to $\Sigma^1$ being placed in the random medium:

$$C=C(p_1,\ldots,p_{r1}).$$

Since $\Sigma^1$ is a finite deterministic automaton, linear resolutions may apply and can be easily driven. The following result can be shown to be valid. This automaton has $\rho_1$ valid ranges corresponding to $\rho_1$ possible branching of the state transition diagram and n states in each branch. If one or more $g_i \geq 0$, W would represent the asymptotic expected winning of $\Sigma^1$ when $n \to \infty$ as illustrated here:

$$W=\max(g_1,\ldots,g_{r1}) \quad (40)$$

If all other nodes obtained optimal ranging estimate, then the value W would be $$W = \max_i \min_j \sum_j g_{ij} m_j \quad (41)$$

In such a case, the competition process is deterministic and falls into the same situation of fixed nodes. The cluster of nodes would keep oscillating due to the technique that enforces discrete disconnected steps, which are imposed to maintain the finite state of the system. But that wouldn't hurt the optimality as the competition would oscillate around the optimum, with the small margin selected to convert $\phi$ to a discrete set. The smaller steps chosen for $\phi$, the closer (but slower) to optimality. Similarly, larger steps chosen for $\phi$, the wider (but faster) from optimality. One can envision a mixed approach with varying steps, but communicating and synchronizing the change in $\phi$ steps would burden the system in practical sense, and would slow the optimization anyway.

Alternatively, if $g_i$ is negative, then:

$$W = \frac{r_1}{\sum \frac{1}{g_i}} \quad (42)$$

In other words, W would equal to the harmonic mean of $g_i$. And the performance would not be optimal following the sense of the competition theory. But equation 41 is valid consistently only when just one $g_i \geq 0$. When more than one of $g_i \geq 0$ exists; the probability of suboptimal performance increases consistently. Hence, equation 41 will never be reached, which counters the non-optimal argument.

Comparing Different Automaton

Let us now compare this deterministic automaton's performance with that of a stochastic automaton described earlier. Only the square law reinforcement following the reinforcement scheme described is considered. Then, I let $\Sigma^1$ have $\rho_1$ states and $\rho_1$ ranges. In state $\phi_i$, $\Sigma^1$ uses the pure range $\rho_i$. On the occurrence of this range, the competition environment (i.e. other nodes) uses the jth range with probability $m_j$. By following the same arguments given previously, one obtains from the competition matrix G the unit loss probability $p_i$ and the unit win probability $q_i$. The square law automation performs optimally if any $p_i < \frac{1}{2}$, in other words, if $\Pi^*_i = 1$ and $\Pi^*_j = 0$, where $j \neq i$, and the asterisk characterizing the final values. The condition $p_i < \frac{1}{2}$ means that $g_i > 0$. Under such a condition:

$$W=\max(g_1,\ldots,g_{r1}) \quad (43)$$

Just as described before in equation 40. Therefore, this stochastic finite state automaton has a performance equivalent to the deterministic automaton only when the later has an infinitely large number of states. Again, if the $m_j$ are such that they constitute an optimal ranging (using the same multilateration approach), W becomes the winning value of the competition as in equation 41.

When the condition $g_i > 0$ is not satisfied for both the deterministic and stochastic automata, they play for the harmonic mean of the $g_i$. This follows from equation 41 for case of stochastic automaton. In this case, W ends up between the upper and lower values of the competition, $$\max_i \min_j g_{ij} \leq W \leq \min_j \max_i g_{ij} \quad (44)$$

Next two automata zero sum competitions can be considered, that can prove that for deterministic automata of, somewhat, different construction from the linear one and infinitely large number of states. The statement here is modified to exclude the possibility of sub-optimality which may or may not be taken into account. Further proofs of sub-optimality in this type of deterministic automata have been demonstrated by computer experiments and simulations. Sub-optimality can be measured by checking if the following conditions apply:

1) If the matrix G has one and only one row of positive (column of negative) elements, then W is the harmonic mean of the elements of this row (column).
2) If G is such that there is no row of all positive elements or no column of all negative elements, then, W=0.

In exploring competitions between two stochastic automata, $\Sigma^1$ and $\Sigma^2$, each with square law reinforcement. Let the state probabilities of $\Sigma^1$ be denoted by $\Pi_i^{(1)}$, $i=1,\ldots,\rho_1$, and $\Pi_j^{(2)}$, $j=1,\ldots,\rho_2$. Final values will be indicated by asterisk. If the probability of unit loss for $\Sigma^\alpha$ is denoted by $p_i^{(\alpha)}$, with a range $\rho_i^{(\alpha)}$, then:

$$p_i^{(1)} = \sum_j p_{ij} \Pi_j^{(2)} \quad (45)$$

Where $p_{ij}=\Pr$ (unit win for $\Sigma^1$ with $F=\{\rho_i^{(1)},\rho_j^{(2)}\}$). And similarly:

$$p_j^{(2)} = \sum_i (1-p_{ij}) \Pi_i^{(1)} \quad (46)$$

Like before, the competition matrix $G=[g_{ij}]$ can be used to obtain:

$$p_{ij} = \frac{1-g_{ij}}{2}, \quad (47)$$
$$q_{ij} = \frac{1+g_{ij}}{2}$$

From equations 45 to 47

$$p_i^{(1)} = \sum_j \frac{1-g_{ij}}{2}, \quad (48)$$
$$\Pi_j^{(2)} = \frac{1}{2}\left(1 - \sum_j g_{ij} \Pi_j^{(2)}\right)$$

Assume that there is a final stochastically stable condition and that the automata have settled in that condition. Now, to determine under what condition $p_i^{(1)*} < 1/2$, which is the condition for optimality in the square law nonlinear reinforcement, from equation 48, an equivalent condition is obtained:

$$\sum_j g_{ij} \Pi_j^{(2)*} > 0 \tag{49}$$

Furthermore, it is required that $\Sigma^1$ to be optimal for all values of $\Pi(2)^*$, i.e. whatever be the ranges chosen by $\Sigma^2$. Then equation 49 becomes:

$$g_{ij} > 0, j=1,2,\ldots,r_2 \tag{50}$$

Once equation 50 is satisfied, it automatically results in $\Pi^{(1)*}$ no having the ith component unity and the others zero. That's to say $\Sigma^1$ is optimal irrespective of the selected ranges in $\Sigma^2$. Equation 50 is equivalent to the existence of an all positive row in the matrix $[g_{ij}]$. Since $[g_{ij}]$ corresponds to the winnings of $\Sigma^1$, modification of equation 50 in order to make $\Sigma^2$ optimal results in the condition:

$$g_{ij} < 0, i=1,2,\ldots,r_1 \tag{51}$$

This is equivalent to a column with all negative elements. Further, suppose that equation 51 is satisfied for some value of i. Then, equation 50 cannot be satisfied, i.e., both $\Sigma^1$ and $\Sigma^2$ cannot be simultaneously asymptotically optimal. Now if $\Sigma^1$ is optimal, then $\Sigma^2$ has a final state probability distribution given to a great degree of accuracy by:

$$\Pi_j^{(2)*} = \frac{\frac{1}{2p_j^{(2)} - 1}}{\left(\sum_j \frac{1}{2p_j^{(2)} - 1}\right)} \tag{52}$$

Then, by reapplying the optimality condition of $\Sigma^1$ from equation 46:

$$p_j^{(2)*} = 1 - p_{ij} = \frac{1 + g_{ij}}{2} \tag{53}$$

Therefore, equation 52 can be rewritten as:

$$\Pi_j^{(2)*} = \frac{\frac{1}{g_{ij}}}{\sum_j \frac{1}{g_{ij}}} \tag{54}$$

Equation 54 can be used to drive the average winnings of $\Sigma^1$ as follows:

$$W = \frac{r_1}{\sum_j \frac{1}{g_{ij}}} \tag{55}$$

= the harmonic mean of the $ith$ row.

Now interchanging the two automata $\Sigma^1$ and $\Sigma^2$, one can easily establish that:

if $g_{ij} < 0, i=1,2,\ldots r_1$ \hfill (56)

Then:

$$W = \frac{r_2}{\sum_i \frac{1}{g_{ij}}} \tag{57}$$

= the harmonic mean of the $jth$ row.

Figure 6:
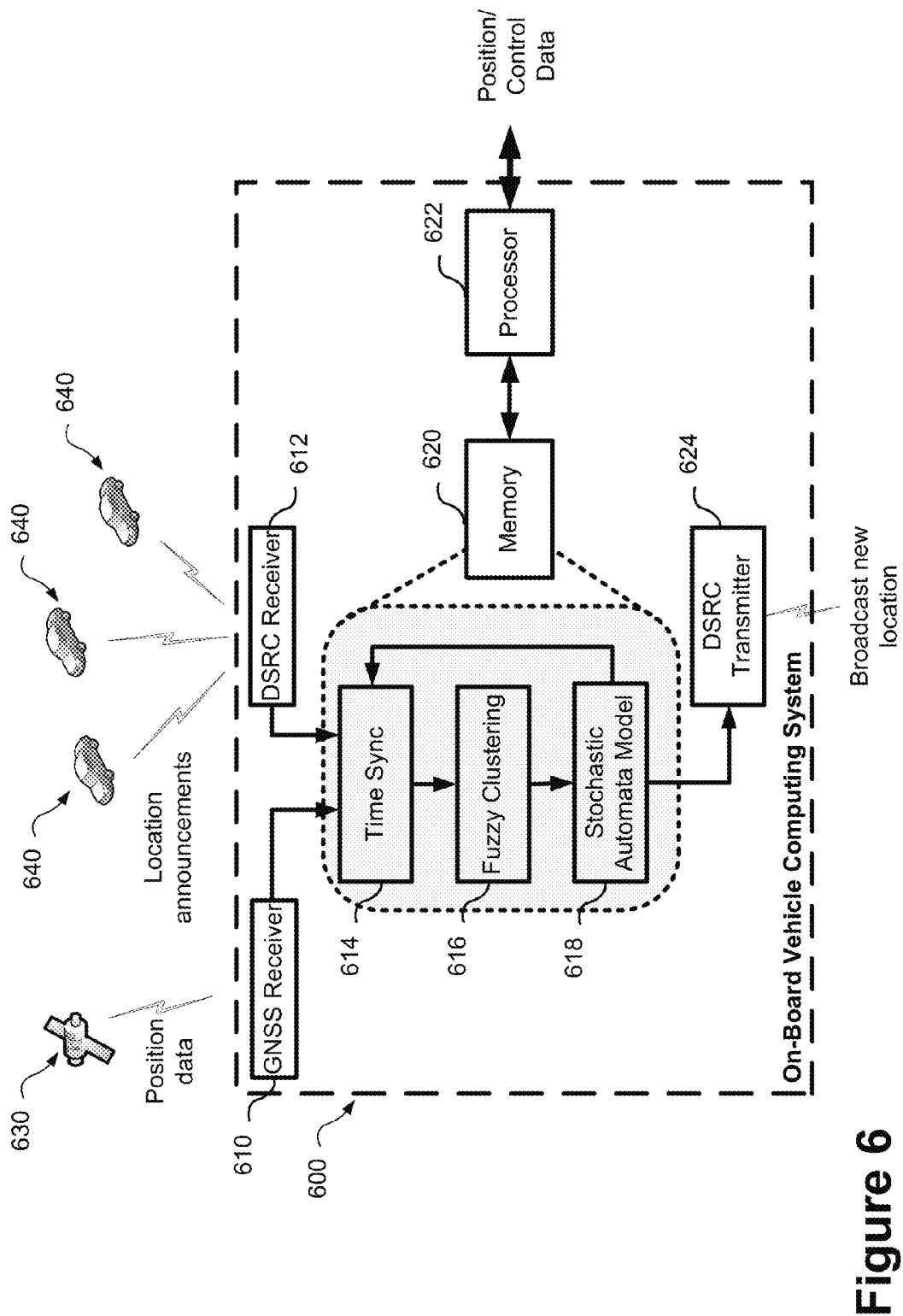
FIG. 6 shows system for performing cooperative stochastic positioning in a vehicular mobile environment utilizing dedicated short-range communications (DSRC)

A view on how the entire process is performed is elaborated in FIG. 6 where the received position announcements are used along with the GNSS estimated position to calculate the accurate position and broadcast it such as in a dedicated short-range communications (DSRC) vehicular environment. The system 600 may be operable in a vehicle where DSRC communication or other inter-vehicle communication system. The vehicle receives position data via a GNSS system using for example GPS from a GNSS network 630 through a GNSS receiver 610. In addition, the DSRC receiver 612 provide position announcements from vehicles 640 that are in proximity of the vehicle containing system 600. As discussed above the received position announcements are processed to refine the accuracy of the vehicles current position. This can be performed by processing the position announcements by one or more processors 622 containing instructions in memory 620 for processing the data. Additional ranging data may be provided by ranging systems such as Lidar (Light detection and ranging), radar, or any wireless or optical ranging technology (not shown) which would enable correlation between the received position announcements and a vehicle position. The memory may comprise modules such as time synchronization module 614 for correlating the position announcements and GPS position data, a fuzzy clustering module 616 for performing clustering functions on the position data, and a stochastic automata model module 618 for determining a more accurate position based upon the received position announcements. The improved position determination can then be transmitted by a DSRC transmitter 624 to other vehicles.

Figure 7:
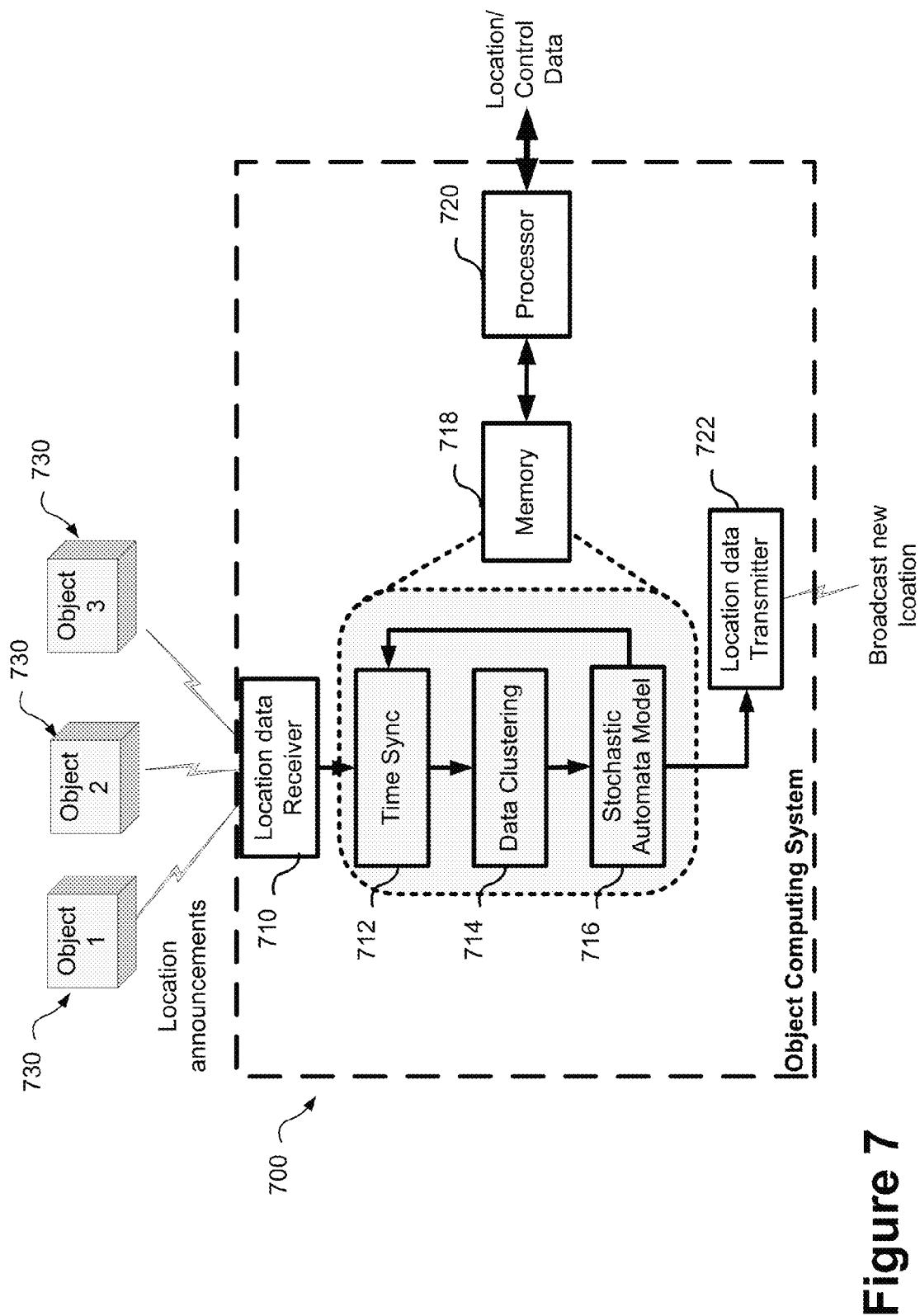
FIG. 7 shows system for performing cooperative stochastic positioning in a mobile environment between objects.

FIG. 7 shows system for performing cooperative stochastic positioning in a mobile environment, for example a closed environment such as a store or warehouse where GNSS systems may not work or provide the required resolution. The system 700 may be operable in any environment that absolute or relative position information is required such as in inventory or warehouse situations using radio frequency identification (RFID) technologies, mobile device positioning or any relative object position applications within a defined coordinate system. The object receives position data via position data receiver 710. The position data may include only relative object position data or may include reference position data based upon fixed position points in the immediate area. In addition, GPS position data may also be utilized if available. As discussed above the received position announcements are processed to refine the accuracy of the objects current position. This can be performed by processing the position announcements by one or more processors 720 containing instructions in memory 718 for processing the data. The memory may comprise modules such as time synchronization module 712 for correlating the position announcements, a fuzzy clustering module 714 for performing clustering functions on the position data, and a stochastic automata model module 716 for determining a more accurate position based upon the received position announcements. The improved position determination can then be transmitted by a position data transmitter 722 to other objects. Position announcements may be transmitted or received by wireless technologies such as Bluetooth, Zigbee, IEEE 802.11, 802.16, cellular or mobile wireless technologies.

Specific embodiments have been shown and described herein. However, modifications and variations may occur to those skilled in the art. All such modifications and variations are believed to be within the scope and sphere of the present disclosure.

The invention claimed is:

1. A method for cooperative stochastic positioning in a mobile environment executed by a processor in an object of interest, the method comprising:
   receiving position announcements transmitted wirelessly from a plurality of objects, the position announcements providing the current position data of the respective object in relation to a common coordinate system;
   discretizing the received position announcements to obtain a plurality of data groupings based upon a clustering criteria applied to the received position data;
   performing clustering of the data groupings to determine which cluster datasets from the data groupings provide sufficient and consistent position accuracy to determine a relative position of the object of interest;
   applying stochastic automata model to selected cluster dataset to evaluate relative cluster weights in order to determine the relative position of the object of interest; and
   updating accuracy of a current position of the object of interest based upon determined relative position.

2. The method of claim 1 wherein discretizing the received position data further comprises applying a channel propagation model on the received object position data to determine range data associated with the respective received object position data.

3. The method of claim 1 wherein discretizing the received position data further comprises receiving range data associated with the received object position data associated with the respective received object position data.

4. The method of claim 1 wherein the performing clustering further comprises:
   applying classifiers to the determined clusters based upon selected criteria;
   determining if the selected cluster dataset provides object position data accuracy within a defined position tolerance; and
   dividing the cluster dataset if the determined accuracy is less than the defined tolerances.

5. The method of claim 1 wherein the performing clustering further comprises:
   selecting clustering criteria to be applied to the received positioning announcements;
   selecting a cluster dataset from the data groupings;
   minimizing error of the selected cluster dataset using selected criteria;
   determining average normalized intergroup scatter between position data provided in the cluster dataset;
   determining a normalized scatter matrix of the position data provided in the cluster dataset;
   determining if criteria should be adjusted based upon normalized scatter matrix;
   determining if cluster dataset should be combined with previously analysed cluster based upon a defined criteria accuracy;
   determining if the cluster dataset provides object position data accuracy within defined position tolerances; and
   dividing the cluster dataset if the determined accuracy is less than the defined tolerances to perform clustering on each of the divided clusters.

6. The method of claim 1 wherein applying stochastic automata model to selected clusters to determine the relative position further comprises:
   calculating a weighted multi-lateration position using the provided cluster datasets;
   applying weighted ranges and a set of multi-lateration to determine an accurate position from the position data in the cluster dataset;
   validate accuracy of obtained position relative to current object of interest position wherein least weighted data is removed from the dataset when dataset positions accuracy is less than required accuracy threshold and current position data is updated with obtained position.

7. The method of claim 1 wherein the clustering criteria is a function of position announcement data properties either determinable by the received announcement data or associated with previously determined characteristics associated with the object providing the position announcement.

8. The method of claim 7 wherein the clustering criteria is selected from the group comprising: least-mean-square (LMS), arrival delay and position announcement data confidence.

9. The method of claim 1 further comprising receiving positioning information at the object of interest from a global positioning system (GPS) and wherein receiving the positioning announcements transmitted from the plurality of objects is via a short range inter-object communication system and the relative object positioning is determined relative to a fixed coordinate system.

10. The method of claim 9 wherein the wireless technology is selected from the group comprising: Bluetooth, Zigbee, IEEE 802.11, 802.16, and cellular based wireless communication technologies.

11. A system for cooperative stochastic positioning in a mobile environment the system comprising:
    a first receiver for receiving positioning announcements from a plurality of objects, the position announcements providing the current position data of the respective object in relation to a common coordinate system;
    processor coupled to the first receiver; and
    a memory comprising instructions for execution by the processor, the instructions comprising:
       discretizing the received position announcements to obtain a plurality of data groupings based upon a clustering criteria applied to the received position data;
       performing clustering of the data groupings to determine which cluster datasets from the data groupings provide sufficient and consistent position accuracy to determine a relative position of the object of interest;
       applying stochastic automata model to selected cluster dataset to evaluate relative cluster weights in order to determine the relative position of an object of interest; and
       updating accuracy of a current position of the object of interest based upon determined relative position.

12. The system of claim 11 further comprising a second receiver for receiving positioning data from a global navigation satellite system for determining a position of the object of interest relative to a defined global coordinate system for the current position.

13. The system of claim 12 wherein the first receiver is a short range wireless communication system for communication between objects in an immediate are near the object of interest.

14. The system of claim 13 wherein the short range wireless communication system is a dedicated short-range communications (DSRC) for vehicular applications.

15. The system of claim 11 further wherein receiving the positioning announcements transmitted from the plurality of objects is a dedicated short range wireless technology and the relative object positioning is determined relative to a fixed coordinate system.

16. The system of claim 15 wherein the wireless technology is selected from the group comprising: Bluetooth, Zigbee, IEEE 802.11, 802.16, and cellular based wireless communication technologies.

17. The system of claim 11 wherein discretizing the received position data further comprises applying a channel propagation model on the received object position data to determine range data associated with the respective received object position data.

18. The system of claim 11 wherein discretizing the received position data further comprises receiving range data associated with the received object position data associated with the respective received object position data.

19. The system of claim 11 wherein the performing clustering further comprises:
    applying classifiers to the determined clusters based upon selected criteria;
    determining if the selected cluster dataset provides object position data accuracy within a defined position tolerance; and
    dividing the cluster dataset if the determined accuracy is less than the defined tolerances.

20. The system of claim 11 wherein the performing clustering further comprises:
    selecting clustering criteria to be applied to the received positioning announcements;
    selecting a cluster dataset from the data groupings;
    minimizing error of the selected cluster dataset using selected criteria;
    determining average normalized intergroup scatter between position data provided in the cluster dataset;
    determining a normalized scatter matrix of the position data provided in the cluster dataset;
    determining if criteria should be adjusted based upon normalized scatter matrix;
    determining if cluster dataset should be combined with previously analysed cluster based upon a defined criteria accuracy;
    determining if the cluster dataset provides object position data accuracy within defined position tolerances; and
    dividing the cluster dataset if the determined accuracy is less than the defined tolerances to perform clustering on each of the divided clusters.

21. The system of claim 11 wherein applying stochastic automata model to selected clusters to determine the relative position further comprises:
    calculating a weighted multi-lateration position using the provided cluster datasets;
    applying weighted ranges and a set of multi-lateration to determine an accurate position from the position data in the cluster dataset;
    validate accuracy of obtained position relative to current object of interest position wherein least weighted data is removed from the dataset when dataset positions accuracy is less than required accuracy threshold and current position data is updated with obtained position.

22. The system of claim 11 wherein the clustering criteria is a function of position announcement data properties either determinable by the received announcement data or associated with previously determined characteristics associated with the object providing the position announcement.

23. The system of claim 22 wherein the clustering criteria is selected from the group comprising: least-mean-square (LMS), arrival delay and position announcement data confidence.

24. A computer readable memory device providing instructions for performing cooperative stochastic positioning in a mobile environment, that when executed by a processor in an object of interest performing the method comprising:
    receiving wirelessly, position announcements transmitted from a plurality of objects, the position announcements providing the current position data of the respective object in relation to a common coordinate system;
    discretizing the received position announcements to obtain a plurality of data groupings based upon a clustering criteria applied to the received position data;
    performing clustering of the data groupings to determine which cluster datasets from the data groupings provide sufficient and consistent position accuracy to determine a relative position of the object of interest;
    applying stochastic automata model to selected cluster dataset position to evaluate relative cluster weights in order to determine the relative position of the object of interest; and
    updating accuracy of a current position of the object of interest based upon determined relative position.

* * * * *